(12) United States Patent
Watanabe et al.

(10) Patent No.: US 10,345,788 B2
(45) Date of Patent: Jul. 9, 2019

(54) ROBOT SYSTEM

(71) Applicant: KAWASAKI JUKOGYO KABUSHIKI KAISHA, Kobe-shi, Hyogo (JP)

(72) Inventors: Masayuki Watanabe, Kobe (JP); Toshihiko Miyazaki, Kobe (JP); Takashi Ohige, Kobe (JP); Ayataka Kobayashi, Amagasaki (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 82 days.

(21) Appl. No.: 15/539,711

(22) PCT Filed: Dec. 26, 2014

(86) PCT No.: PCT/JP2014/006512
§ 371 (c)(1),
(2) Date: Jun. 26, 2017

(87) PCT Pub. No.: WO2016/103308
PCT Pub. Date: Jun. 30, 2016

(65) Prior Publication Data
US 2017/0357242 A1    Dec. 14, 2017

(51) Int. Cl.
*G06F 19/00* (2018.01)
*G05B 19/4061* (2006.01)
(Continued)

(52) U.S. Cl.
CPC ........ *G05B 19/4061* (2013.01); *B25J 9/1666* (2013.01); *B25J 9/1676* (2013.01);
(Continued)

(58) Field of Classification Search
CPC ........ B25J 19/06; B25J 9/1666; B25J 9/1676; G05B 19/4061; G05B 2219/40202; G05B 2219/42288
See application file for complete search history.

(56) References Cited

U.S. PATENT DOCUMENTS

| 8,788,093 B2* | 7/2014 | Sakakibara | ............ B25J 9/1674 |
| | | | 307/326 |
| 2007/0135966 A1* | 6/2007 | Kawaguchi | .......... G05D 1/0242 |
| | | | 700/245 |

(Continued)

FOREIGN PATENT DOCUMENTS

| JP | H11-320477 A | 11/1999 |
| JP | H11-347983 A | 12/1999 |

(Continued)

OTHER PUBLICATIONS

Mar. 24, 2015 International Search Report issued in Patent Application No. PCT/JP2014/006512.
(Continued)

*Primary Examiner* — Harry Y Oh
(74) *Attorney, Agent, or Firm* — Oliff PLC

(57) ABSTRACT

A controller is configured to operate a robot arm at a speed that is equal to or lower than a first maximum speed in a high-speed operation region, and operate the robot arm at a speed that is equal to or lower than a second maximum speed lower than the first maximum speed in a low-speed operation region, and change a collision detection sensitivity between the high-speed operation region and the low-speed operation region so that the collision detection sensitivity in the high-speed operation region becomes lower than the collision detection sensitivity in the low-speed operation region.

6 Claims, 5 Drawing Sheets

(51) Int. Cl.
*B25J 19/06* (2006.01)
*B25J 9/16* (2006.01)

(52) U.S. Cl.
CPC ..... *B25J 19/06* (2013.01); *G05B 2219/40202* (2013.01); *G05B 2219/42288* (2013.01)

(56) References Cited

U.S. PATENT DOCUMENTS

| | | | | |
|---|---|---|---|---|
| 2008/0161970 | A1* | 7/2008 | Adachi | B25J 9/0003 700/253 |
| 2010/0191372 | A1* | 7/2010 | Nihei | B25J 9/1676 700/245 |
| 2011/0295419 | A1* | 12/2011 | Abdallah | B25J 9/1612 700/245 |
| 2014/0288707 | A1* | 9/2014 | Asahi | B25J 9/1674 700/253 |
| 2016/0001446 | A1* | 1/2016 | Caldas | B25J 9/1676 702/190 |
| 2017/0210008 | A1* | 7/2017 | Maeda | B25J 9/0087 |

FOREIGN PATENT DOCUMENTS

| | | |
|---|---|---|
| JP | 2010-188515 A | 9/2010 |
| JP | 2010-208002 A | 9/2010 |
| JP | 4648486 B2 | 3/2011 |
| JP | 4995458 B2 | 8/2012 |
| JP | 5035768 B2 | 9/2012 |
| JP | 2014-054722 A | 3/2014 |
| JP | 5523386 B2 | 6/2014 |
| JP | 2014-180725 A | 9/2014 |
| WO | 2014/124869 A1 | 8/2014 |

OTHER PUBLICATIONS

Jun. 27, 2017 International Preliminary Report on Patentability issued in Patent Application No. PCT/JP2014/006512.

* cited by examiner

ROBOT SYSTEM

TECHNICAL FIELD

The present invention relates to a robot system in which an operator and a robot exist together to work in the same work space.

BACKGROUND ART

Conventionally, in an industrial robot system, a safety fence is typically provided to completely separate a work space of a robot and a work space of an operator from each other to prevent a situation in which the robot and the operator work in the same work space at the same time. The safety fence inhibits the operator from physically entering a movable range of the robot during an operation of the robot. In this way, safety for the operator is secured. Examples of techniques for supporting this are as follows. Patent Literature 1 discloses that a limit region which limits the operation of a robot is set in a handover region where an object is handed over between the robot and the operator when it is detected that the operator has entered the handover region. Patent Literature 2 discloses that a limit region is set with respect to coordinate values of the tip end of an arm of the robot, and a speed of the arm is limited based on a distance with this limit region.

CITATION LIST

Patent Literature

Patent Literature 1: Japanese Laid-Open Patent Application Publication No. 2014-180725
Patent Literature 2: Japanese Laid-Open Patent Application Publication No. Hei. 11-347983

SUMMARY OF INVENTION

Technical Problem

In recent years, there has been a demand for improvement of a productivity, by introducing the robot into a production line, and operating the robot in the production line where the operator works.

However, in the above-described conventional techniques, to secure safety for the operator who works in the production line where the robot works (operates), it is necessary to provide the safety fence, or the like. This increases introduction cost of the robot, and is undesirable. Thus, in a case where the robot is introduced into the production line and works in the production line where the operator works, high safety cannot be obtained in the conventional techniques.

In view of the above-described circumstances, an object of the present invention is to improve safety for an operator and work efficiency, in a robot system in which the operator and the robot exist together to work in the same work space.

Solution to Problem

According to an aspect of the present invention, a robot system in which an operator and a robot exist together to work in a same work space, comprises a robot including a robot arm including a plurality of links coupled to each other via joints; a control section which controls an operation of the robot arm; and a collision stop section which detects that the robot arm has collided against an object and stops the robot arm, wherein a high-speed operation region and a low-speed operation region are set for the robot arm, wherein the control section is configured to operate the robot arm at a speed that is equal to or lower than a first maximum speed, in the high-speed operation region, and operate the robot arm at a speed that is equal to or lower than a second maximum speed lower than the first maximum speed, in the low-speed operation region, and wherein the collision stop section is configured to change a collision detection sensitivity between the high-speed operation region and the low-speed operation region so that the collision detection sensitivity in the high-speed operation region becomes lower than the collision detection sensitivity in the low-speed operation region.

In general, in collision detection that detects that the robot arm has collided against an object, there is a tendency that a probability of the misdetection (hereinafter this will be referred to as a misdetection rate) due to a noise or the like is increased, as the collision detection sensitivity is increased (threshold signal level at which it is determined that the collision has occurred is reduced), and the misdetection rate is increased as the operation speed of the robot arm is increased.

In accordance with the above-described configuration, the collision stop section changes the collision detection sensitivity between the high-speed operation region and the low-speed operation region so that the collision detection sensitivity in the high-speed operation region becomes lower than the collision detection sensitivity in the low-speed operation region. Therefore, compared to a case where the collision detection sensitivity is not changed between the high-speed operation region and the low-speed operation region, the maximum operation speed in the high-speed operation region can be set to be higher than that in the low-speed operation region, while maintaining the misdetection rate at a constant value in the high-speed operation region and the low-speed operation region.

A region of the operation region of the robot arm, which is closer to the work region of the operator, is set as the low-speed operation region, and the collision detection sensitivity in the low-speed operation region is set to be as high as possible. In this setting, even in a case where the operator contacts the robot arm, the robot arm collides against the operator at a low speed, and can be stopped with a high sensitivity. In contrast, the robot arm can be operated at a speed that is as high as possible in the high-speed operation region. As a result, compared to a case where the collision detection sensitivity is not changed between the high-speed operation region and the low-speed operation region, safety for the operator can be improved, and the work efficiency can be increased.

The collision stop section may be configured to change the collision detection sensitivity so that the collision detection sensitivity in the high-speed operation region becomes zero. In accordance with this configuration, it is not necessary to take the misdetection of the collision into account. Therefore, the robot arm can be operated at a high speed in the high-speed operation region within a range of allowable performance of the robot arm. This can increase work efficiency.

In the above robot system, a region of an operation region of the robot arm, which is closer to a work region of the operator, may be set as the low-speed operation region, and a region of the operation region of the robot arm, which is other than the low-speed operation region, may be set as the high-speed operation region.

In accordance with this configuration, even if the operator contacts the robot arm, the robot arm collides against the operator at a low speed, and can be stopped with a high sensitivity.

The control section may be configured to operate the links which are entirely located in the high-speed operation region at a speed that is equal to or lower than the first maximum speed and operate the links which are at least partially located in the low-speed operation region at a speed that is equal to or lower than the second maximum speed.

In accordance with this configuration, safety for the operator can be secured more reliably.

At least one intermediate-speed operation region may be provided between the high-speed operation region and the low-speed operation region in such a manner that the high-speed operation region, the at least one intermediate-speed operation region, and the low-speed operation region are arranged in this order, and the control section may be configured to operate the robot arm in the at least one intermediate-speed operation region, at a speed that is equal to or lower than a third maximum speed lower than the first maximum speed and at a speed that is equal to or lower than a fourth maximum speed higher than the second maximum speed, the first maximum speed, the third maximum speed, the fourth maximum speed, and the second maximum speed decreasing in this order, in a direction from the high-speed operation region toward the low-speed operation region.

In accordance with this configuration, the maximum speed of the robot arm can be gradually changed.

The collision stop section may be configured to change the collision detection sensitivity so that the collision detection sensitivity in the high-speed operation region, the collision detection sensitivity in the at least one intermediate-speed operation region, and the collision detection sensitivity in the low-speed operation region are increased in this order, in the high-speed operation region, the at least one intermediate-speed operation region, and the low-speed operation region.

In accordance with this configuration, the collision detection sensitivity can be gradually changed.

In a case where the control section moves the robot arm from a region corresponding to a higher maximum speed (hereinafter this region will be referred to as a relative high-speed operation region) to a region corresponding to a lower maximum speed (hereinafter this region will be referred to as a relative low-speed operation region), which are two adjacent regions, among the high-speed operation region, the at least one intermediate-speed operation region, and the low-speed operation region, the controller may operate the robot arm at a speed that is equal to or lower than the maximum speed corresponding to the relative low-speed operation region, from a location that is farther from the relative low-speed operation region than a boundary between the relative high-speed operation region and the relative low-speed operation region is, and in a case where the control section moves the robot arm from the relative low-speed operation region to the relative high-speed operation region, the control section may operate the robot arm at a speed that is equal to or lower than the maximum speed corresponding to the relative high-speed operation region, from a location that is farther from the relative high-speed operation region than the boundary between the relative high-speed operation region and the relative low-speed operation region is.

In accordance with this configuration, in a case where the control section moves the robot arm from the relative high-speed operation region to the relative low-speed operation region, the operation of the robot arm is changed to a low-speed operation before the robot arm enters the relative low-speed operation region. Therefore, safety can be improved compared to a case where the maximum speed does not have hysteresis characteristics. In contrast, in a case where the control section moves the robot arm from the relative low-speed operation region to the relative high-speed operation region, the operation of the robot arm is changed to a high-speed operation before the robot arm enters the relative high-speed operation region. Therefore, work efficiency can be increased compared to a case where the maximum speed does not have hysteresis characteristics.

Advantageous Effects of Invention

In accordance with the present invention, it becomes possible to provide a robot system in which an operator and a robot can exit together to work in the same work space while securing safety.

DESCRIPTION OF EMBODIMENTS

Hereinafter, the embodiment of the present invention will be described with reference to the accompanying drawings. Throughout the drawings, the same or corresponding constituents are identified by the same reference symbols and will not be described repeatedly.

Figure 1:
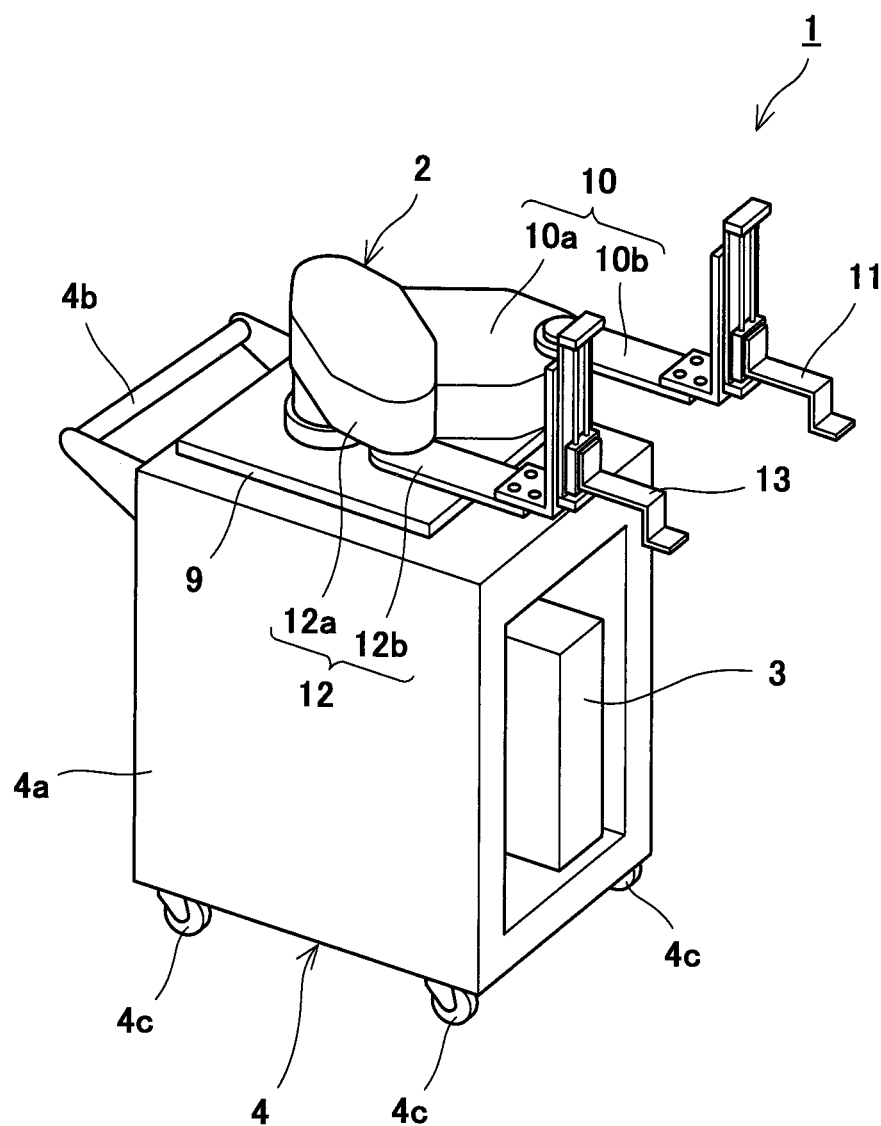
FIG. 1 is a perspective view showing the configuration of a robot system according to Embodiment 1.

FIG. 1 is a perspective view showing the configuration of a robot system according to Embodiment 1. As shown in FIG. 1, a robot system 1 includes a robot body (hereinafter this will be simply referred to as a robot) 2, and a controller 3 which controls the robot 2. The robot system 1 is a system in which an operator and the robot 2 exist together to work in the same work space.

It is sufficient that the robot 2 is a robot including a robot arm including a plurality of links which are coupled to each other via joints. In the present embodiment, the robot 2 is a Selective Compliance Assembly Robot Arm (SCARA) robot which is of a coaxial and dual-arm type. The robot 2 includes a lower arm 10 disposed on a base 9, and an upper arm 12 disposed on the lower arm 10. The lower arm 10 includes a first link 10a and a second link 10b which are coupled to each other via a joint. The upper arm 12 includes a first link 12a and a second link 12b which are coupled to each other via a joint.

The controller 3 is connected to the robot 2 via a control line (not shown). The controller 3 is, for example, a robot controller including a computer such as a microcontroller. The controller 3 is not a single controller but may include a plurality of controllers. In the present embodiment, the controller 3 is accommodated in, for example, a carriage 4. The carriage 4 includes a body 4a with a rectangular parallelepiped box shape, a handle 4b attached on the upper portion of the body 4a, and wheels 4c provided on four corners of the bottom surface of the body 4a.

Figure 2:
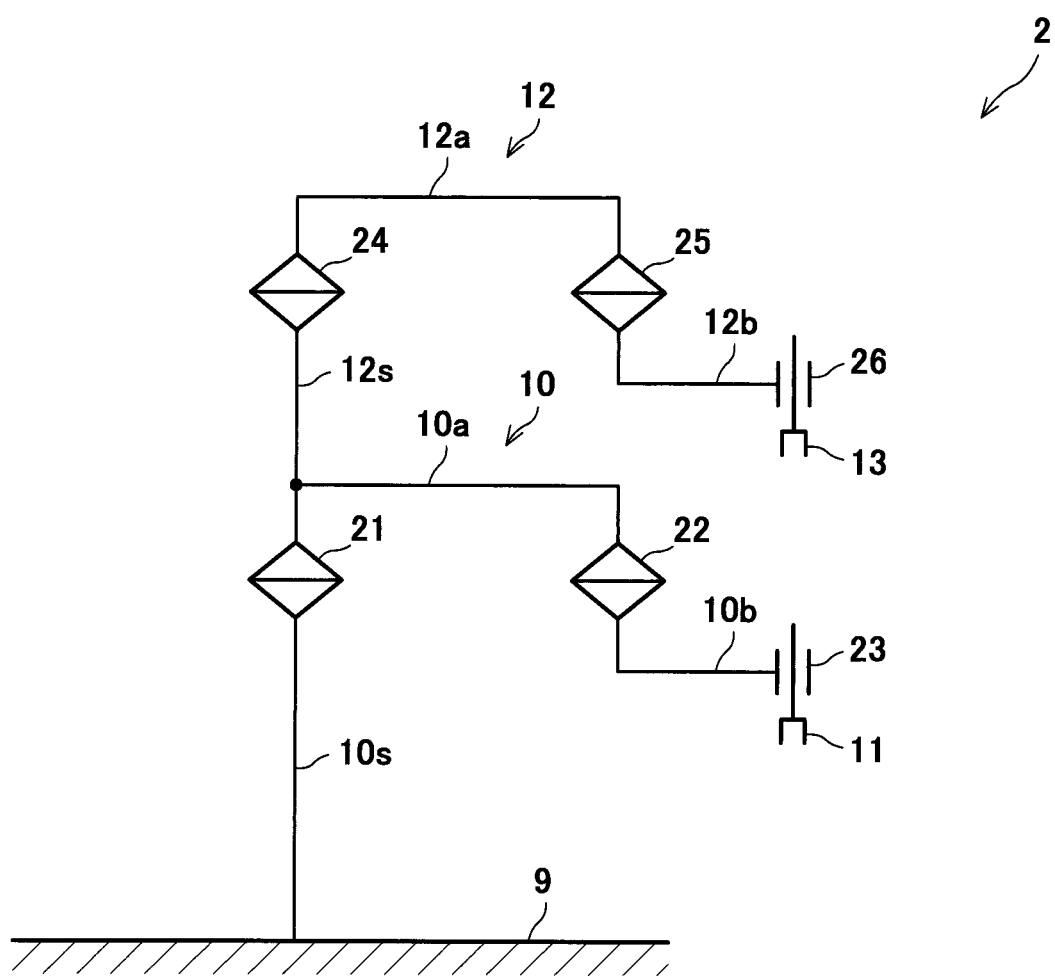
FIG. 2 is a schematic view showing a joint structure of a robot arm of FIG. 1.

FIG. 2 is a schematic view showing a joint structure of the lower arm 10 and the upper arm 12. As shown in FIG. 12, the lower arm 10 includes a first axis 21 which is a rotary (rotational) joint, a second axis 22 which is a rotary (rotational) joint, and a third axis 23 which is a translational (prismatic) joint. The lower arm 10 has three degrees of freedom of the first axis 21, the second axis 22, and the third axis 23. The upper arm 12 includes a fourth axis 24 which is a rotary (rotational) joint, a fifth axis 25 which is a rotary (rotational) joint, and a sixth axis 26 which is a translational (prismatic) joint. The upper arm 12 has three degrees of freedom of the fourth axis 24, the fifth axis 25, and the sixth axis 26.

In the lower arm 10, a support member 10s is provided on the upper surface of the base 9. A first end portion of the first link 10a horizontally extending is coupled to the support member 10s via the first axis 21 having a rotational axis vertical to the base 9. A second end portion of the first link 10a is coupled to a first end portion of the second link 10b via the second axis 22 having a vertical rotational axis. The second link 10b horizontally extends. A first end effector 11 is coupled to a second end portion of the second link 10b via the third axis 23 having a vertical translational direction. In this configuration, the third axis 23 allows the first end effector 11 to be movable up and down, at the tip end portion of the second link 10b.

In the upper arm 12, a support member 12s is provided on the upper surface of the first link 10a of the lower arm 10. A first end portion of a first link 12a horizontally extending is coupled to the support member 12s via the fourth axis 24 having a vertical rotational axis. The fourth axis 24 is disposed in such a manner that the rotational axis of the fourth axis 24 conforms to that of the first axis 21. A second end portion of the first link 12a is coupled to a first end portion of the second link 12b via the fifth axis 25 having a vertical rotational axis. The second link 12b horizontally extends. A second end effector 13 is coupled to a second end portion of the second link 12b via the sixth axis 26 having a vertical translational direction. In this configuration, the sixth axis 26 allows the second end effector 13 to be movable up and down, at the tip end portion of the second link 12b. The reference position of the first end effector 11 and the reference position of the second end effector 13 are set to positions on the same horizontal plane (see FIG. 1)

The axes 21 to 26 included in the lower arm 10 and the upper arm 12 are driven by a servo mechanism (not shown). The servo mechanism includes a driving unit which displaces the arms, and a transmission mechanism which transmits a driving force of the driving unit to the arms. In the present embodiment, a driving unit is constituted by electric motors, for example, servo motors. The lower arm 10 and the upper arm 12 are operated by the servo mechanism in response to a command provided by the controller 3. In other words, the controller 3 controls the positions of the servo motors to control the operation of the lower arm 10 and the operation of the upper arm 12 at desired speeds. The fourth axis 24 of the upper arm 12 is connected to the first axis 21 of the lower arm 10 via the support member 12s and the first link 10a of the lower arm 10 in such a manner that the fourth axis 24 and the first axis 21 of the lower arm 10 have the common rotational axis. The fourth axis 24 of the upper arm 12 is controlled to perform a specified rotation so that the rotation of the first axis 21 is cancelled.

Figure 3:
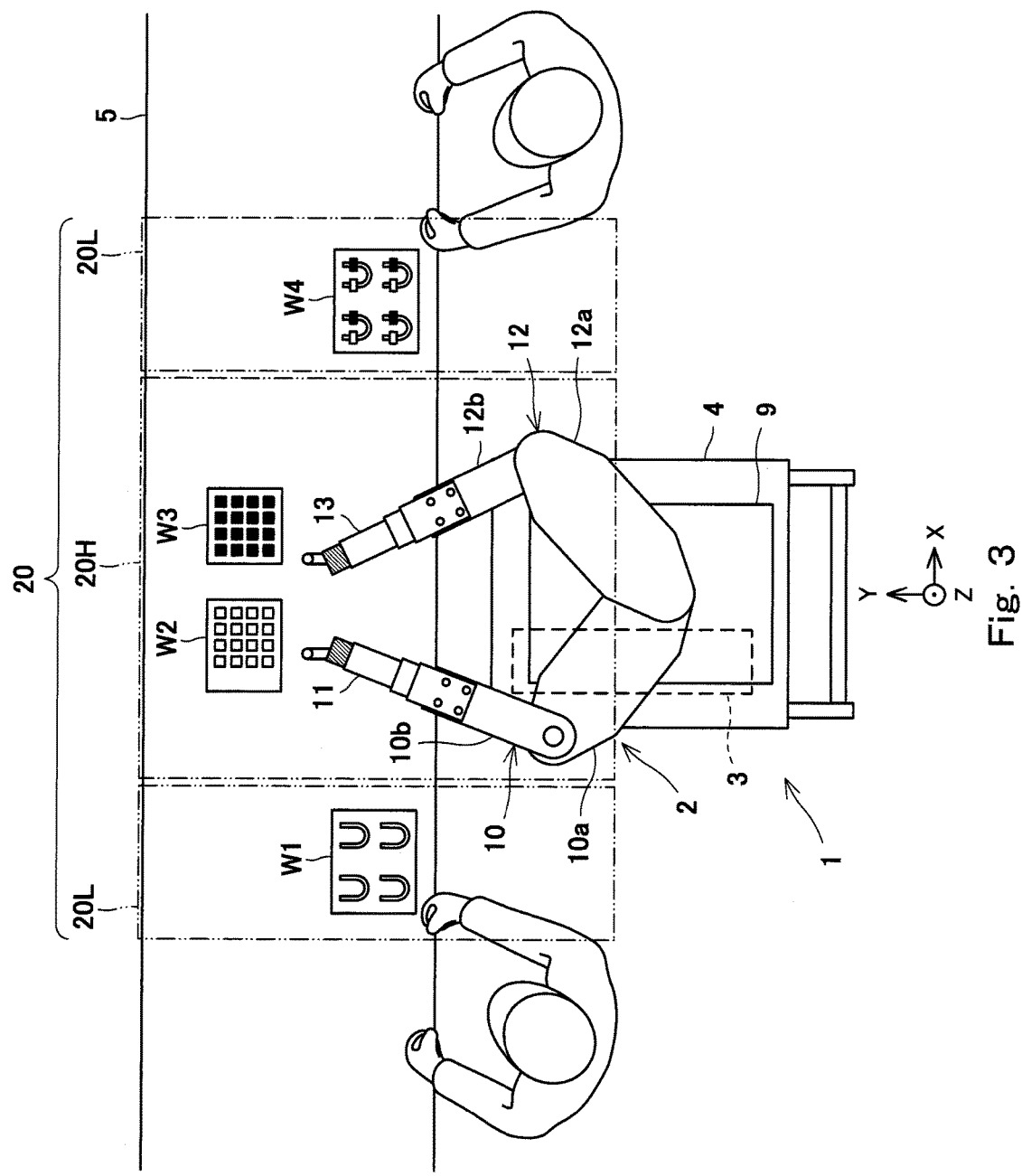
FIG. 3 is a plan view of the robot system of FIG. 1.

FIG. 3 is a plan view of the robot system 1. As shown in FIG. 3, the robot system 1 is introduced into, for example, a production line, and is configured to work (operate) in a line where the operator works. The robot 2 of the robot system 1 has a reference coordinate system (hereinafter will be referred to as a base coordinate system). In this coordinate system, for example, an intersection of an installation surface of the base 9 and the rotational axis of the first axis 21 (see FIG. 2) of the lower arm 10 is an origin, the rotational axis of the first axis 21 is a Z-axis, an arbitrary axis orthogonal to the Z-axis is a X-axis, and an axis orthogonal to the Z-axis and the X-axis is a Y-axis. An operation region 20 of the lower arm 10 and the upper arm 12 of the robot 2 is set based on this base coordinate system as a reference. In the present embodiment, the operation region 20 is set to have a rectangular shape in a plan view which covers a work table 5 placed in front of the robot 2. On the work table 5, for example, four kinds of workpieces W1, W2, W3, W4 are placed. The robot 2 is configured to work (perform an operation) in the operation region 20, as in the operators. Regions on the right and left sides of the operation region 20 are works regions, respectively, where the operators perform work steps on the work table 5. For example, the operator located on the left side supplies the workpiece (material member) W1 to the robot 2. The robot 2 attaches the workpiece (first part) W2 and the workpiece (second part) W3 to the workpiece (material member) W1 supplied to the robot 2 to finish the workpiece (finished product) W4. The operator located on the right side performs a next work step for the workpiece (finished product) W4.

The controller 3 controls the operation of the lower arm 10 and the operation of the upper arm 12 so that the lower arm 10 and the upper arm 12 operate within the operation region 20. The operation region 20 includes a high-speed operation region 20H and low-speed operation regions 20L. Regions with a rectangular shape in a plan (top) view, of the operation region 20, which are closer to work regions of the operators, respectively, are set as the low-speed operation regions 20L. A region of the operation region 20, which is other than the low-speed operation regions 20L, and has a rectangular shape in a plan view, is set as the high-speed operation region 20H. In the present embodiment, the low-speed operation regions 20L are set on the right and left sides of the high-speed operation region 20H, respectively.

The controller 3 is configured to operate the lower arm 10 and the upper arm 12 at a speed that is equal to or lower than a first maximum speed in the high-speed operation region 20H, and operate the lower arm 10 and the upper arm 12 at a speed that is equal to or lower than a second maximum speed lower than the first maximum speed in each of the low-speed operation regions 20L. The second maximum speed in the low-speed operation regions 20L is set to, for example, 250 mm/s defined as a low speed control in ISO10218-1. With this control, the lower arm 10 and the upper arm 12 can be operated at a speed that is as high as possible, in the high-speed operation region 20H. As a result, the work (operation) efficiency of the robot 2 can be increased.

The controller 3 is configured to operate the links which are entirely located in the high-speed operation region 20H at the speed that is equal to or lower than the first maximum speed and operate the links which are at least partially located in each of the low-speed operation regions 20L at the speed that is equal to or lower than the second maximum speed. With this control, safety for the operators can be secured more reliably.

Further, in a case where the controller 3 moves the lower arm 10 and the upper arm 12, from the high-speed operation region 20H to each of the low-speed operation regions 20L, the controller 3 gradually reduces the operation speeds of the arms. On the other hand, in a case where the controller 3 moves the lower arm 10 and the upper arm 12 from each of the low-speed operation regions 20L to the high-speed operation region 20H, the controller 3 gradually increases the operation speeds of the arms. This can suppress a rapid change in the operation speeds. Therefore, safety is improved.

Further, the controller 3 has a collision stop function of detecting a collision of the lower arm 10 or the upper arm 12 against an object and stopping the operation of the lower arm 10 or the operation of the upper arm 12. The controller 3 is configured to change a collision detection sensitivity between the high-speed operation region 20H and each of the low-speed operation regions 20L so that the collision detection sensitivity in the high-speed operation region 20H becomes lower than that in each of the low-speed operation regions 20L. With this control, even if the operator contacts the lower arm 10 or the upper arm 12, the lower arm 10 or the upper arm 12 collides against the operator at a low speed, and can be stopped with a high sensitivity. In addition, the lower arm 10 or the upper arm 12 can be operated at a speed that is as high as possible in the high-speed operation region 20H.

Figure 4:
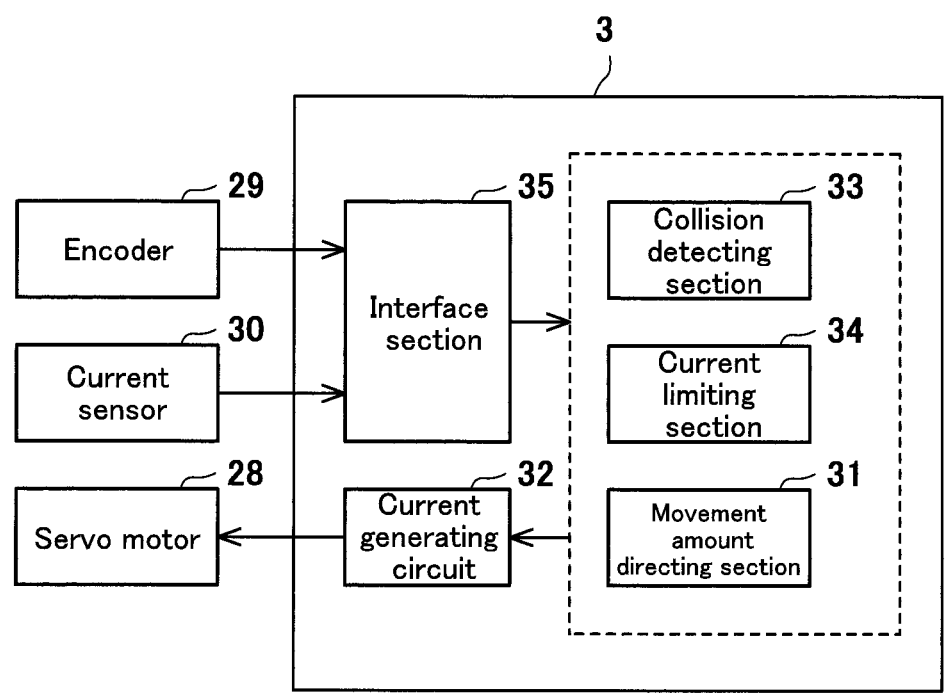
FIG. 4 is a block diagram showing the configuration of a controller of the robot system of FIG. 1.

Hereinafter, the specific configuration of the controller 3 which realizes the above-described functions will be described with reference to the block diagram of FIG. 4. As shown in FIG. 4, the controller 3 includes a movement amount directing section 31, a current generating circuit 32, a collision detecting section 33, a current limiting section 34, and an interface section 35. The controller 3 is implemented by, for example, a processor such as a computer or a microcontroller. The controller 3 executes predetermined programs to implement the movement amount directing section 31, the collision detecting section 33, and the current limiting section 34.

FIG. 4 shows a servo motor 28 as a driving device which drives the axes 21 to 26 included in the lower arm 10 and the upper arm 12. Although one servo motor 28 is shown in FIG. 4, other servo motors 28 have the same configuration. An encoder 29 which detects the position of the servo motor 28 (rotational angle position of a rotor with respect to a reference rotational angle position), and a current sensor 30 which detects the value of a current flowing through the servo motor 28 are attached on the servo motor 28. The controller 3 is configured to obtain the position of the servo motor 28 which is detected by the encoder 29 and the value of the current flowing through the servo motor 28 which is detected by the current sensor 30, via the interface section 35.

The movement amount directing section 31 calculates a current command value based on a predetermined position command value and the detected position information from the encoder 29. The movement amount directing section 31 calculates the current command value required to move the lower arm 10 and the upper arm 12 to the high-speed operation region 20H or the low-speed operation region 20L. In a normal state in which the lower arm 10 and the upper arm 12 do not collide against an obstacle, the controller 3 provides the current command value calculated by the movement amount directing section 31 to the current generating circuit 32.

The current generating circuit 32 generates a current in accordance with the current command value provided by the movement amount directing section 31, and flows the generated current through the servo motor 28. The current generating circuit 32 is an amplifier which generates a driving current of the servo motor 28 in accordance with the current command value, namely, a servo amplifier. Since the positions of the servo motors 28 of the axes 21 to 26 are controlled in the above-described manner, the controller 3 can operate the lower arm 10 and the upper arm 12 at the speed that is equal to or lower than the first maximum speed in the high-speed operation region 20H and at the speed that is equal to or lower than the second maximum speed lower than the first maximum speed in each of the low-speed operation regions 20L. In addition, the controller 3 calculates the position information of the links in the base coordinate system as the reference, by coordinate transformation. In this way, the controller 3 can operate the links which are entirely located in the high-speed operation region 20H at the speed that is equal to or lower than the first maximum speed and operate the links which are at least partially located in each of the low-speed operation regions 20L at the speed that is equal to or lower than the second maximum speed.

The collision detecting section 33 detects that the lower arm 10 or the upper arm 12 has collided against the object, based on the detected position information from the encoder 29 and the current value from the current sensor 30, and outputs a collision detection signal indicating that the lower arm 10 or the upper arm 12 has collided against the object, to the current limiting section 34, which will be described later.

Receiving the collision detection signal from the collision detecting section 33, the current limiting section 34 limits the current command value calculated by the movement amount directing section 31, and provides the limited current command value to the current generating circuit 32. In this way, when the collision detecting section 33 detects that the lower arm 10 or the upper arm 12 has collided against the object, the current output from the current generating circuit 32 is reduced to be less than that which is not limited, and the reduced current is supplied to the servo motor 28. Limiting the current may be reducing the current command value provided by the movement amount directing section 31 in a predetermined reduction ratio, or limiting the current to a predetermined constant value without relation to (independently of) the current command value provided by the movement amount directing section 31. This includes a case where the predetermined reduction ratio is 0%. In this case, in limiting the current, the current supplied from the current generating circuit 32 to the servo motor 28 is zero. The supply of the current to the servo motor 28 is inhibited.

[Collision Detection Process]

Figure 5:
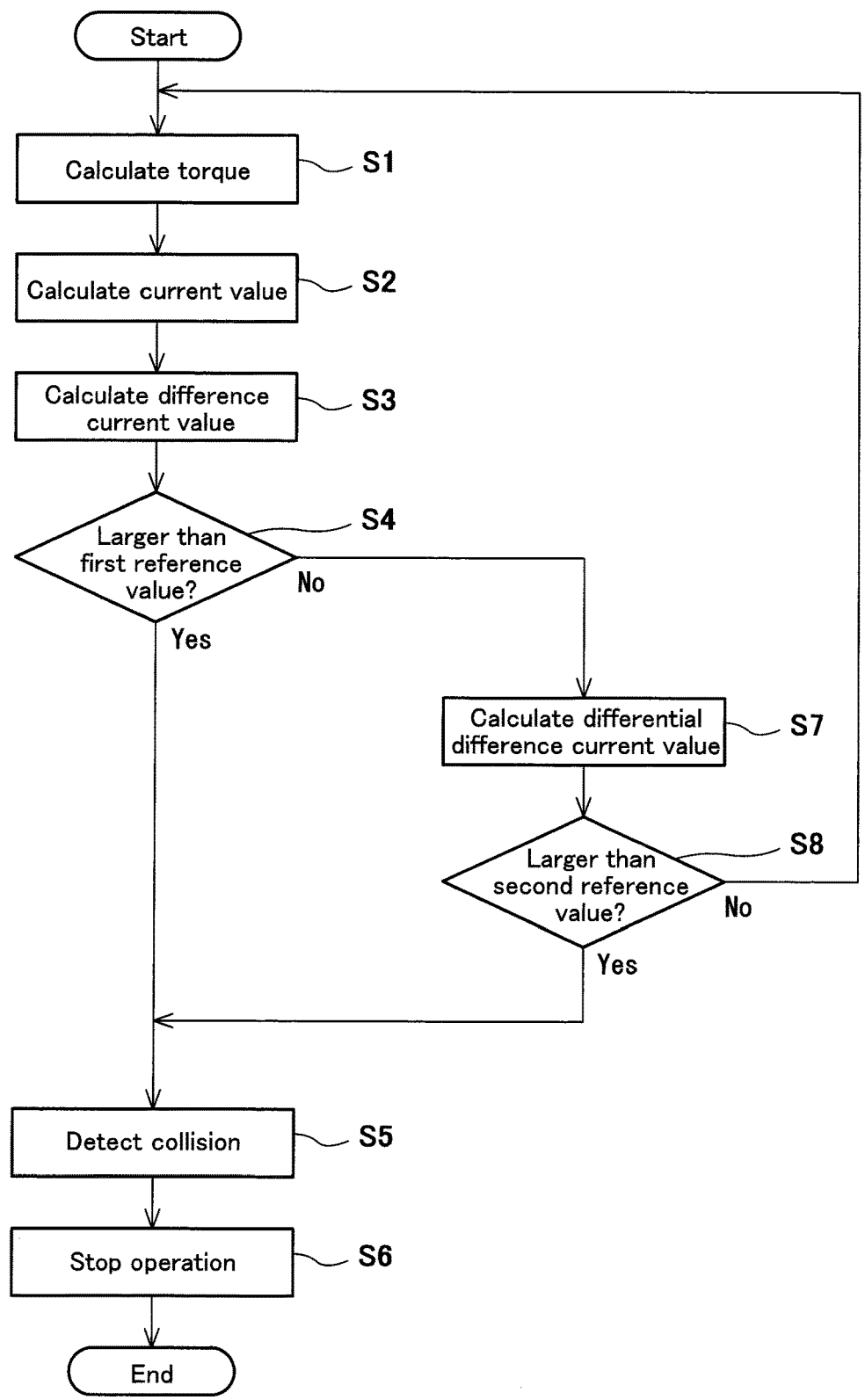
FIG. 5 is a flowchart for explaining a process for detecting a collision of the robot arm of FIG. 1.

Next, a collision detection process performed by the controller 3 will be described with reference to the flowchart of FIG. 5. The controller 3 repeats this process at constant time intervals (e.g., every 20 msec).

Initially, the collision detecting section 33 (see FIG. 4) calculates torque generated in the axes 21 to 26 (see FIG. 2) included in the lower arm 10 and the upper arm 12 of the robot 2, based on variables indicating the positions at given time, of the axes 21 to 26 (step S1). The collision detecting section 33 (see FIG. 4) calculates the torque by use of a motion equation of a typical robot.

Then, the collision detecting section 33 calculates a current required for each of the servo motors 28 to generate the calculated torque (hereinafter this current will be referred to as a theoretical current value) (step S2).

Then, the collision detecting section 33 obtains the value of a current actually flowing through each of the servo motors 28 (hereinafter this current will be referred to as an actual current value) which is detected by the current sensor 30, and calculates a difference current value indicating an absolute value of a difference between the theoretical current value and the actual current value (step S3).

Then, the collision detecting section 33 determines whether or not the difference current value is larger than a first reference value set for each of the axes (step S4). In a case where the collision detecting section 33 determines that the difference current value is larger than the first reference value, the collision detecting section 33 determines that the collision has occurred, and outputs the collision detection signal indicating that the collision has been detected to the current limiting section 34 (see FIG. 4) (step S5). Then, the current limiting section 34 provides the limited current command value to the current generating circuit 32, and stops (ceases) current supply to the servo motor 28 (step S6).

On the other hand, in a case where the collision detecting section 33 determines that the difference current value is less than the first reference value in step S4, the collision detecting section 33 calculates a differential difference current value (change speed (rate) of the difference current value) which is a differential value of the difference current value (step S7), and determines whether or not the differential difference current value is larger than a second reference value set for each of the axes 21 to 26 (step S8). In a case where the collision detecting section 33 determines that the differential difference current value is larger than the second reference value, the collision detecting section 33 determines that the collision has occurred, and moves to step S5 and the following steps. On the other hand, in a case where the collision detecting section 33 determines that the differential difference current value is less than the second reference value, the collision detecting section 33 determines that the collision has not occurred, and returns to start (normal position control process).

As described above, in the present embodiment, the collision detecting section 33 is configured to detect the collision against the obstacle based on the actual current value of the current supplied to the servo motor 28 for driving each of the axes 21 to 26 included in the lower arm 10 and the upper arm 12 of the robot 2. Therefore, it is not necessary to provide a torque sensor or an observer to detect the collision, and the configuration can be simplified.

The collision detecting section 33 determines that the collision has occurred in a case where the change amount of the difference current value is larger than the first reference value or the differential difference current value indicating the change speed of the difference current value is larger than the second reference value. Therefore, the collision can be detected more quickly and more accurately, irrespective of the magnitude of the driving speed of a member to be driven.

[Collision Detection Sensitivity]

Next, the collision detection sensitivity will be described. If the first reference value and the second reference value in determination of the collision (step S4 and step S8) are set to be smaller, the collision detection sensitivity can be increased. However, the set values of the first reference value and the second reference value are too small, misdetection may occur frequently, for example, a fluctuation of the driving current due to an electric noise or the like is determined as occurrence of the collision. Therefore, reliability of the collision detection is low. On the other hand, if the set values of the first reference value and the second reference value are too large, the collision detection sensitivity is reduced, and collision detection timing is retarded. In view of this, it is necessary to properly set the first reference value and the second reference value to quickly and accurately detect the collision.

In the present embodiment, the collision detecting section 33 changes the collision detection sensitivity between the high-speed operation region 20H and each of the low-speed operation regions 20L so that the collision detection sensitivity in the high-speed operation region 20H becomes lower than that in each of the low-speed operation regions 20L. In other words, the first reference value and the second reference value in the high-speed operation region 20H are set to be higher than those in each of the low-speed operation regions 20L. In the present embodiment, the first reference value and the second reference value are set so that the collision detection sensitivity in the high-speed operation region 20H becomes zero. In this setting, it is not necessary to take misdetection of the collision into account. Therefore, the robot arm can be operated at a high speed in the high-speed operation region 20H within a range of allowable performance of the robot arm. This can increase work efficiency.

As described above, in the collision detection that detects that the robot arm has collided against the object, there is a tendency that a probability of the misdetection (hereinafter this will be referred to as a misdetection rate) due to the noise or the like is increased, as the collision detection sensitivity is increased (threshold signal level at which it is determined that the collision has occurred is reduced). Also, there is a tendency that the misdetection rate is increased as the operation speed of the robot arm is increased, like the present embodiment.

In accordance with the present embodiment, the collision detecting section 33 changes the collision detection sensitivity between the high-speed operation region 20H and each of the low-speed operation regions 20L so that the collision detection sensitivity in the high-speed operation region 20H becomes lower than that in each of the low-speed operation regions 20L. Therefore, compared to a case where the collision detection sensitivity is not changed between the high-speed operation region 20H and each of the low-speed operation regions 20L, the maximum operation speed in the high-speed operation region 20H can be set to be higher than that in each of the low-speed operation regions 20L, while maintaining the misdetection rate at a constant value in the high-speed operation region 20H and each of the low-speed operation regions 20L.

The regions of the operation region 20 of the robot arm (the lower arm 10 and the upper arm 12), which are closer to the work regions of the operators, respectively, are set as the low-speed operation regions 20L, and the collision detection sensitivity in each of the low-speed operation regions 20L is set to be as high as possible. In this setting, even in a case where the operator contacts the robot arm (the lower arm 10 and the upper arm 12), the robot arm (the lower arm 10 and the upper arm 12) collides against the operator at a low speed, and can be stopped with a high sensitivity. In contrast, the robot arm can be operated at a speed that is as high as possible in the high-speed operation region 20H.

As a result, compared to a case where the collision detection sensitivity is not changed between the high-speed operation region 20H and each of the low-speed operation regions 20L, safety for the operators can be improved, and the work efficiency can be increased.

The robot 2 of the present embodiment is the robot of a coaxial and dual-arm type. The robot 2 can be disposed in a small space, and is capable of performing an operation similar to detailed manual work performed by the operator. Therefore, the robot 2 can easily replace the operator in the production line.

Other Embodiments

In other embodiments, at least one intermediate-speed operation region 20M (not shown) may be provided between the high-speed operation region 20H and the low-speed operation region 20L in such a manner that the high-speed operation region 20H, the at least one intermediate-speed operation region 20M, and the low-speed operation region 20L are arranged in this order. The controller 3 may be configured to operate the robot arm in the at least one intermediate-speed operation region 20M, at a speed that is equal to or lower than a third maximum speed lower than the first maximum speed and a speed that is equal to or lower than a fourth maximum speed higher than the second maximum speed, the first maximum speed, the third maximum speed, the fourth maximum speed, and the second maximum speed decreasing in this order, in a direction from the high-speed operation region 20H toward the low-speed operation region 20L. In this way, the maximum speed of the robot arm (10, 12) can be gradually changed. The maximum speed can be set in multiple stages.

The collision detecting section 33 may be configured to change the collision detection sensitivity in the high-speed operation region 20H, the at least one intermediate-speed operation region 20M, and the low-speed operation region 20L in such a manner that the collision detection sensitivity is increased in the direction from the high-speed operation region 20H toward the low-speed operation region 20L. In this way, the collision detection sensitivity can be gradually changed, and can be set in multiple stages.

Further, in a case where the controller 3 moves the robot arm (10, 12) from a region corresponding to a higher maximum speed (hereinafter this region will be referred to as a relative high-speed operation region) to a region corresponding to a lower maximum speed (hereinafter this region will be referred to as a relative low-speed operation region), which are two adjacent regions, among the high-speed operation region 20H, the at least one intermediate-speed operation region 20M, and the low-speed operation region 20L, the controller 3 operates the robot arm (10, 12) at a speed that is equal to or lower than the maximum speed corresponding to the relative low-speed operation region, from a location that is farther from the relative low-speed operation region than a boundary between the relative high-speed operation region and the relative low-speed operation region is. Also, in a case where the controller 3 moves the robot arm (10, 12) from the relative low-speed operation region to the relative high-speed operation region, the controller 3 operates the robot arm (10, 12) at a speed that is equal to or lower than the maximum speed corresponding to the relative high-speed operation region, from a location that is farther from the relative high-speed operation region than the boundary between the relative high-speed operation region and the relative low-speed operation region is. With this control, in a case where the controller 3 moves the robot arm (10, 12) from the relative high-speed operation region to the relative low-speed operation region, the operation of the robot arm (10, 12) is changed to a low-speed operation before the robot arm (10, 12) enters the relative low-speed operation region. Therefore, safety can be improved, compared to a case where the maximum speed does not have hysteresis characteristics. In contrast, in a case where the controller 3 moves the robot arm (10, 12) from the relative low-speed operation region to the relative high-speed operation region, the operation of the robot arm (10, 12) is changed to a high-speed operation before the robot arm (10, 12) enters the relative high-speed operation region. Therefore, work efficiency can be increased compared to a case where the maximum speed does not have hysteresis characteristics.

Although in the present embodiment, the collision detecting section 33 promptly stops the operation of the robot arm (10, 12) after detection of the collision, the present invention is not limited to this. For example, in a case where the collision detecting section 33 detects the collision against the obstacle, the controller 3 may perform a stress relieving process for relieving a stress generated between the member to be driven and the obstacle, due to the collision. Specifically, the controller 3 detects whether or not the arm has collided against the obstacle, and controls the operation of the arm so that the arm is moved away a specified distance from the obstacle based on a path before the collision, in a case where the controller 3 detects that the arm has collided against the obstacle. More specifically, in the case of detection of the collision, the collision detecting section 33 performs the following operation. Regarding the axis in which a value obtained by subtracting the actual current value of the servo motor 28 from the theoretical current value of the servo motor 28 has a sign opposite to that of the theoretical current value, the collision detecting section 33 performs a retracting process for moving the axis in a direction opposite to that of the movement of the axis before the collision. On the other hand, regarding the axis in which the value obtained by subtracting the actual current value of the servo motor 28 from the theoretical current value of the servo motor 28 has the same sign as that of the theoretical current value, the collision detecting section 33 performs an advancing process for moving the axis in the same direction as that of the movement of the axis before the collision. This can mitigate an impact of the collision. As a result, safety can be further improved.

Although in the present embodiment, the collision detection sensitivity (the first reference value, the second reference value) at the detection of the collision is manually set, and is changed (switched) between the high-speed operation region 20H and the low-speed operation region 20L, the collision detection sensitivity may be automatically set. Specifically, the controller 3 causes the robot 2 to perform particular work (operation), the robot 2 to learn maximum torque generated in each of the axes 21 to 26 in every operation of the robot 2, and sets the first reference value and the second reference value based on the learned maximum torque. This makes it possible to set the collision detection sensitivity to an optimal value corresponding to an operation environment.

Although in the present embodiment, the controller 3 changes the speed between the high-speed operation region 20H and the low-speed operation region 20L, by software processing, for example, the controller 3 may determine that the arm has moved beyond the region by use of a hardware such as a sensor.

Although in the present embodiment, the collision detecting section 33 detects the collision based on the detected position information and the detected current value of the servo motor 28, this is merely exemplary. For example, the robot system 1 may include a vision sensor attached on the arm, and the controller 3 may detect that the arm has collided against the obstacle based on an image taken by the vision sensor. In this configuration, the collision detection function of the present embodiment can be replaced or assisted by the vision sensor. Further, another collision detection sensor such as an acceleration sensor or a pressure sensor may be used.

Although in the present embodiment, the robot 2 is the SCARA robot of a coaxial and dual-arm type, this is merely exemplary. For example, the robot 2 may be a single arm robot or a vertical articulated robot.

Although in the present embodiment, the high-speed operation region 20H and each of the low-speed operation regions 20L have a rectangular shape when viewed from above (in a plan view), this is merely exemplary, and the high-speed operation region 20H and each of the low-speed operation regions 20L may have a desired shape.

Numerous improvements and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention is effectively used in a robot system in which an operator and a robot exist together to work in the same work space.

REFERENCE SIGNS LIST 1 robot system
2 robot body
3 controller
4 carriage
5 work table
9 base
10 lower arm
10a first link (lower arm)
10b second link (lower arm)
11 first end effector
12 upper arm
12a first link (upper arm)
12b second link (upper arm)
13 second end effector
20 operation region
20H high-speed operation region
20L low-speed operation region
21 to 26 first to sixth axes
28 servo motor
29 encoder
30 current sensor
31 movement amount directing section
32 current generating circuit
33 collision detecting section
34 current limiting section
35 interface section

The invention claimed is:

1. A robot system in which an operator and a robot exist together to work in a same work space, the robot system comprising:
a robot including a robot arm including a plurality of links coupled to each other via joints;
a control section which controls an operation of the robot arm; and
a collision stop section which detects that the robot arm has collided against an object and stops the robot arm,
wherein the control section is configured to set a high-speed operation region and a low-speed operation region for the robot arm, the low-speed operation region being closer than the high-speed operation region to the operator,
wherein the control section is configured to operate the robot arm at a speed that is equal to or lower than a first maximum speed in the high-speed operation region, and operate the robot arm at a speed that is equal to or lower than a second maximum speed lower than the first maximum speed in the low-speed operation region, and
wherein the collision stop section is configured to change a collision detection sensitivity between the high-speed operation region and the low-speed operation region so that the collision detection sensitivity in the high-speed operation region becomes lower than the collision detection sensitivity in the low-speed operation region.

2. The robot system according to claim 1,
wherein the collision stop section is configured to change the collision detection sensitivity so that the collision detection sensitivity in the high-speed operation region becomes zero.

3. The robot system according to claim 1,
wherein the control section is configured to operate the links which are entirely located in the high-speed operation region at a speed that is equal to or lower than the first maximum speed and operate the links which are at least partially located in the low-speed operation region at a speed that is equal to or lower than the second maximum speed.

4. The robot system according to claim 1,
wherein at least one intermediate-speed operation region is provided between the high-speed operation region and the low-speed operation region in such a manner that the high-speed operation region, the at least one intermediate-speed operation region, and the low-speed operation region are arranged in this order, and
wherein the control section is configured to operate the robot arm in the at least one intermediate-speed operation region, at a speed that is equal to or lower than a third maximum speed lower than the first maximum speed and at a speed that is equal to or lower than a fourth maximum speed higher than the second maximum speed, the first maximum speed, the third maximum speed, the fourth maximum speed, and the second maximum speed decreasing in this order, in a direction from the high-speed operation region toward the low-speed operation region.

5. The robot system according to claim 4,
wherein the collision stop section is configured to change the collision detection sensitivity so that the collision detection sensitivity in the high-speed operation region, the collision detection sensitivity in the at least one intermediate-speed operation region, and the collision detection sensitivity in the low-speed operation region are increased in this order, in the high-speed operation region, the at least one intermediate-speed operation region, and the low-speed operation region.

6. The robot system according to claim 4,
wherein in a case where the control section moves the robot arm from a first operation region corresponding to a higher maximum speed to a second operation region corresponding to a lower maximum speed, which are two adjacent regions, among the high-speed operation region, the at least one intermediate-speed operation region, and the low-speed operation region, the controller operates the robot arm so that an operation speed of the robot arm becomes close to a speed that is equal to or lower than the maximum speed corresponding to the second operation region, from a location that is farther from the second operation region than a boundary between the first operation region and the second operation region is, and wherein in a case where the control section moves the robot arm from the second operation region to the first operation region, the control section operates the robot arm so that the operation speed of the robot arm becomes close to a speed that is equal to or lower than the maximum speed corresponding to the first operation region, from a location that is farther from the first operation region than the boundary is.

\* \* \* \* \*